United States Patent [19]
Hurst

[11] 3,804,983
[45] Apr. 16, 1974

[54] HAND HELD PROBE FOR USE IN ELECTRICAL SENSING OF PLANE COORDINATES

[75] Inventor: George S. Hurst, Oak Ridge, Tenn.

[73] Assignee: The Board of Trustees by the University of Kentucky, Lexington, Ky.

[22] Filed: June 13, 1972

[21] Appl. No.: 262,345

[52] U.S. Cl. ................. 178/87, 178/18, 33/1 M
[51] Int. Cl. ....................... G06k 9/00, G06k 7/00
[58] Field of Search .......... 346/74 S, 74 SC, 74 SB, 346/139 C, 78, 141–143; 219/384; 33/1 M; 30/358, 368, 16; 340/365 S; 178/18, 19, 20, 87

[56] References Cited
UNITED STATES PATENTS

| 1,905,288 | 4/1933 | Hoffman | 346/78 |
| 3,504,436 | 4/1970 | Ebert | 30/358 |
| 3,705,408 | 12/1972 | Krone et al. | 346/139 C |
| 2,270,898 | 1/1942 | Robinson | 178/18 |
| 3,523,161 | 8/1970 | Lewin | 340/365 S |
| 3,541,706 | 11/1970 | Shapiro | 178/87 |
| 3,308,253 | 3/1967 | Krakinoski | 178/18 |

Primary Examiner—Thomas A. Robinson
Attorney, Agent, or Firm—William E. Sherwood

[57] ABSTRACT

A probe with a puncturing, electrically conducting needle is constructed to enable the user, whether right or left handed, to position the needle rapidly and accurately at a selected coordinate of a sensor package.

4 Claims, 5 Drawing Figures

PATENTED APR 16 1974  3,804,983
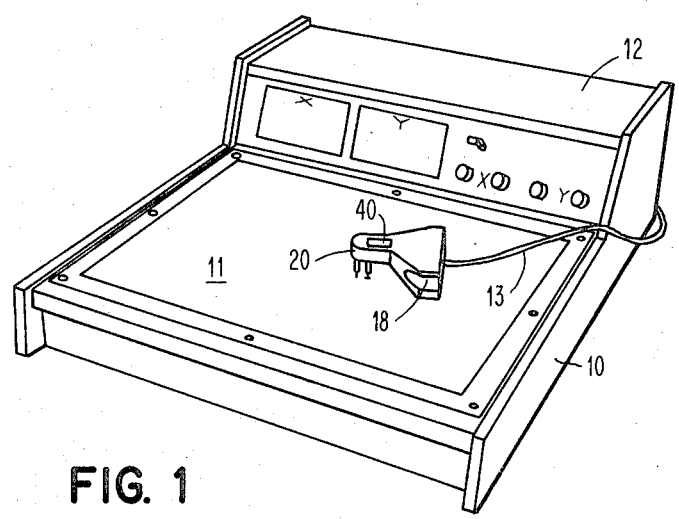
FIG. 1
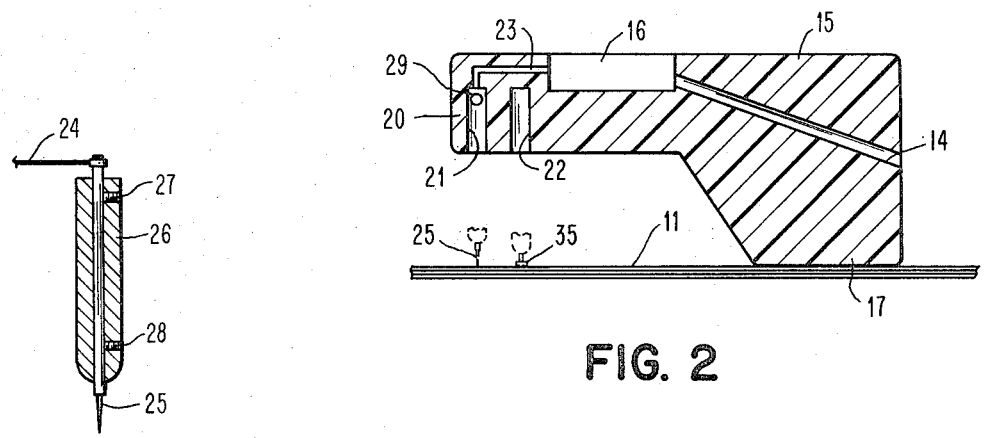
FIG. 2
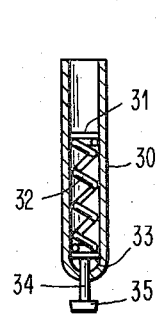
FIG. 3
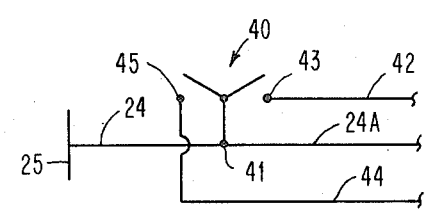
FIG. 4
FIG. 5

HAND HELD PROBE FOR USE IN ELECTRICAL SENSING OF PLANE COORDINATES

BACKGROUND OF THE INVENTION

In Hurst et al. U.S. Pat. No. 3,662,105 an improved arrangement for electrically sensing information relating to plane coordinates and for transmitting the same to an information indicating unit is disclosed, and in which a manually held probe or cursor is employed. Moreover, in the copending U.S. Pat. application, Hurst et al., Ser. No. 245,564 filed Apr. 19, 1972, now U.S. Pat. No. 3,735,023, an improved sensor package which is intended to be punctured by a probe and with which the present invention is especially suitable for use, is likewise disclosed.

Despite the simplicity of the probe structure certain exacting requirements therefor must be met and so far as I am aware, presently available probes are inadequate for these purposes. Accordingly, it is a purpose of the invention to provide a probe which satisfies such requirements.

SUMMARY

The invention comprises a probe which has a readily manipulable body portion with a flat lower face adapted to slide over the flat surface of a sensor sheet and with the distal end of the body portion being elevated from the sheet and of much narrower width than the portion of the body gripped by the user. Adjacent that distal end an electrically conducting puncturing needle is mounted in such position that its end may be easily indexed upon a desired point of the sheet surface and when pressed into the sheet will travel in a direction substantially normal to the sheet surface.

The point of the needle normally is held out of contact with the sheet by means of a stabilizing post supported by the body portion and having a sheet-engaging foot resiliently biased to permit the needle to penetrate the sheet when the post is pushed against the sheet. An electrical conductor extends from the needle and preferably is connected to a manually operable switch mounted at the upper portion of the probe body and from such switch one or more conductors carrying signals lead to associated apparatus.

Among the objects of the invention are the provision of a probe which can be easily moved to a precise coordinate position and whose needle position with respect to the coordinate position can be readily observed; the provision of a probe having a switch mounted thereon in a readily accessible position for operation either with the right or the left hand which is holding the probe; the provision of a probe having a longitudinally adjustable needle permitting varying degrees of penetration of a sensor package; and the provision of a probe which is stable in its setting upon a flat sensor package.

These and other objects and advantages of the invention will become more apparent as the description proceeds and when considered in conjunction with the accompanying drawings, in which FIG. 1 is a perspective view of one form of equipment with which the improved probe may be used.

FIG. 2 is a longitudinal sectional view through the body of the probe to a larger scale, certain portions of the probe being omitted in the interest of clarity.

FIG. 3 is a sectional view of the needle and its housing, shown to a larger scale.

FIG. 4 is a sectional view of the stabilizing post and its spring-biased foot portion, shown to a larger scale, and FIG. 5 is a diagrammatic view of one form of electrical circuit employed with the probe in a typical use of the invention.

Referring now to FIG. 1, a cabinet 10 detachably supports on its working surface a sensor package 11 and provides interior space for conductors (not shown) extending from the electrodes of the package to suitable power sources and to data indicating apparatus. Conveniently, these power sources for energizing the package may comprise batteries housed within the cabinet and the indicating apparatus may be housed in a readily visible form in an elevated back portion 12 of the cabinet. A cable 13 located externally of the cabinet leads to the probe of the present invention and may be extended through the bore 14 of the main body portion 15 of the probe (FIG. 2) to connect with a suitable switch mounted in recess 16 at the upper side of that body portion. The probe body preferably is formed of a dielectric plastic material and has a lower flat face 17 adapted to slide along the confronting surface of the package 11. The lower face comprises an appreciable area and in conjunction with the stabilizing post adds to the stability of the probe and reduces any tendency of the same to topple over.

The lateral sides of the body portion may be formed with curved recesses, one of which is seen at 18, to permit a secure and comfortable grip by the hand of the user, either with the right or left hand. The distal end 20 of the body portion is elevated from the face 17 and is much narrower than the main portion of the body being gripped by the user, thus to permit the user to view the point at which the needle is to pierce the package 11.

Recesses 21 and 22 for holding the needle and a stabilizing post are formed in that distal end portion, and an interior bore 23 extending from recess 16 to recess 21 likewise is formed to accomodate a conductor 24 leading to the needle. As best shown in FIG. 3, an elongated metallic needle 25 which conveniently may comprise music wire of about 0.059 inch diameter is slidably housed for a purpose later to be described within a metallic cylinder 26 having a pair of spaced, interiorly threaded, lateral bores 27 and 28 into which small set screws (not shown) may be inserted. A lateral bore 29 (FIG. 2) may be provided in the distal portion of the probe body for adjustment of the set screw entering bore 27 of that cylinder while the set screw entering bore 28 may be adjusted exteriorly of the probe body. Conductor 24 is connected in any suitable manner to the upper portion of the needle and the cylinder 26 is mounted with a tight press fit in recess 21 of that probe body.

Considering now FIG. 4, an elongated cylindrical housing 30 serving as a stabilizing post contains an interior abutment 31 beneath which a compression spring 32 bears upon a piston 33 attached to rod 34 slidably projecting from the lower end of the housing. At its lower end the rod mounts a plastic bead or foot portion 35 normally in contact with the surface of package 11. The housing 30 is mounted with a tight press fit in recess 22 of the probe body. The mounting of this housing and the bias of the spring preferably are such that normally the tip of needle 25 is held out of contact with the package 11, but when the housing 30 is pressed downwardly against the bias of the spring the needle punctures the package in a direction substantially normal to the plane of the package and, depending upon the setting of the needle in its confining cylinder 26, may enter the package for a relatively deep penetration. When the needle so enters a plurality of sheets of the package the friction of the needle therewith usually is sufficient to overcome the bias of spring and to require a conscious lifting of the probe by the user in order to disengage the needle from the package. This is a desirable feature in that the user thus may separately adjust the gain of the data indicating circuits while still obtaining a signal through the needle.

As seen in FIG. 1, a conventional logic switch 40, such as the single pole, double throw Minneapolis Honeywell No. 15X1-T Micro switch, is housed in recess 16 of the probe body and with its button exposed for convenient manipulation by a finger of the hand holding the probe. Extending from the central terminal 41 of the switch is a grounded conductor 24A within cable 13 as well as the conductor 24 leading to the needle. A second conductor 42 within the cable leads to terminal 43 while a third conductor 44 within the cable leads to another switch terminal 45. Thus, by suitable manipulation of the switch logic command signals may be transmitted as contemplated in the above-mentioned U.S. Pat. No. 3,662,105, as for example instruction of a point plotter for coordinates, instructing a computer or a desk calculator to accept information or to instruct a teletypewriter to print, punch or to conduct other functions.

Having thus described a preferred form of probe construction, it will be understood that the invention may be embodied in other forms without departing from the scope of the invention as defined in the appended claims.

What is claimed is:

1. A self-supporting probe for use in the electrical sensing of plane coordinates including a manipulable body portion having a flat face slidable along and in contact with a plane surface from which a coordinate measurement is to be taken, said body portion mounting an electrically conducting needle and a stabilizing post spaced from the needle and serving to hold the probe against toppling when not being manipulated, said post being biased to hold said needle normally out of contact with said surface and to permit puncturing of said surface by said needle upon forceably pressing said post against said surface, and an electrical conductor extending from said needle and serving to assist in the sensing of the coordinate of said surface corresponding to the point at which said needle punctures said surface.

2. A probe as defined in claim 1 wherein said post includes an adjustable foot portion biased with a compression spring and serving to limit the extent of penetration of said surface by said needle.

3. A probe as defined in claim 2 wherein the mount of said needle upon said probe includes means for selectively adjusting the effective puncturing length of said needle.

4. A probe as defined in claim 1 wherein the width of said body portion mounting said needle is substantially smaller than the width of said portion having said face in contact with said surface thereby to provide convenient viewing of the point of penetration of said needle into said surface.

* * * * *